United States Patent [19]
Goldstein et al.

[11] 3,872,311
[45] Mar. 18, 1975

[54] SELF-POWERED NEUTRON DETECTOR

[75] Inventors: Norman P. Goldstein, Delmont, Pa.;
William H. Todt, Elmira Heights, N.Y.

[73] Assignee: Westinghouse Electric Corporation, Pittsburgh, Pa.

[22] Filed: July 5, 1973

[21] Appl. No.: 376,848

[52] U.S. Cl. .............................. 250/390, 250/391
[51] Int. Cl. ............................................ G01t 3/00
[58] Field of Search.................... 250/390, 391, 392

[56] References Cited
UNITED STATES PATENTS
3,259,745   7/1966   Garlick et al. ..................... 250/392
3,603,793   9/1971   Warren .............................. 250/336

Primary Examiner—Archie R. Borchelt
Attorney, Agent, or Firm—W. G. Sutliff

[57] ABSTRACT

A self-powered neutron detector is detailed wherein a thin conductive layer of low neutron cross section, high density material is disposed about an emitter core of material which spontaneously emits radiation on neutron capture. The high density material is absorptive of beta radiation emitted by decay of the emitter core activation product, but is substantially transmissive to the high average energy prompt electrons emitted by the emitter core material.

5 Claims, 2 Drawing Figures

SELF-POWERED NEUTRON DETECTOR

BACKGROUND OF THE INVENTION

The present invention relates to self-powered neutron detectors which are used to indicate neutron and gamma flux levels. The self powered neutron detectors to date have comprised an emitter core material surrounded by insulating material which is in turn surrounded by an electrically conductive collector material. The emitter is a conducting or semi-conducting material which spontaneously emits radiation when a neutron is absorbed. The insulator is a densely compacted dielectric material that retains a high electric resistivity even when continuously exposed to intense radiation. The collector is a conducting material which produces few electrons or gamma rays in neutron flux. The electrons emitted by the emitter pass to the collector and this electron current is measured as an indication of the neutron flux.

A self-powered neutron detector is particularly advantageous for in-core reactor usage because of its long term reliability. A typical prior art neutron detector is shown in U.S. Pat. No. 3,375,370. The selection of the emitter core material for such devices is limited because of the well known fact that many materials upon neutron absorption produce activation products which decay by emitting beta radiation, which causes a background signal that increases with detector irradiation. The current levels produced by such self-powered neutron detectors are very low and the signal to background noise ratio can make impractical use of many emitter materials. For in-core safety applications it is very important that the response time of the neutron detector be approximately instantaneous to indicate instantaneous neutron-flux level deviations.

Another type of self-powered neutron detector is illustrated by U.S. Pat. No. 3,259,745, wherein low neutron cross section boron, and particularly activation product boron-12 is utilized. The boron-12 decays by beta emission with most of the beta radiation passing through a stainless steel sleeve disposed about the boron-12, and also through an insulating material to the collector electrode. This device thus uses the beta radiation produced by a decaying activation product. Yet another self-powered neutron detector is illustrated by U.S. Pat. No. 3,603,793, which utilizes an emitter core material which emits what are termed prompt electrons, that is electrons produced upon emission of gamma radiation as a result of neutron capture. The gamma radiation interacts with the emitter material to produce high average energy electrons. The emitter materials taught in the patent are ytterbium or hafnium. These emitter materials also have activation products which decay by beta radiation, and this beta radiation can be characterized as delayed electrons which have a lower average energy level than the prompt electrons. This prior art neutron detector utilized a very thick insulating layer to absorb the lower average energy delayed electrons to thereby reduce the background electron flow. Such a thick insulating layer lowers the overall sensitivity of the device and presents dimensional difficulties because the overall diameter of the neutral detector is limited for such in-core uses. Any increase in the insulating layer would necessitate a decrease in the emitter core layer which would thereby lower the sensitivity of the device. Such a thick insulator layer would also only be useful where the beta radiation produced by decay of the actual activation product has a very low average energy level.

The self-powered neutron detectors can then be classified as being of the delayed type, in which the emitter is typically boron or rhodium, and instantaneous types in which the emitter is typically cobalt, hafnium, or ytterbium. The delayed type detectors are used for neutron flux mapping because of their high accuracy, while instantaneous types are used for safety monitoring. The instantaneous type detectors exhibit a certain portion of delayed type activity caused by beta decay of activation products which contributes an undesired "background noise" level relative to the instantaneous response due to instantaneous neutron capture.

SUMMARY OF THE INVENTION

A self-powered neutron detector comprising a radiation absorptive emitter core comprised of a high neutron cross section material that spontaneously emits radiation on capturing neutrons. The emitter core material is preferably a conducting material and more particularly is cobalt or gold. The radiation produced by the emitter core includes a high average energy prompt electron component produced by emitter-gamma ray interactions, and a lower average energy delayed beta radiation component emitted by decay activation products of the emitter core material. A thin conductive layer of low neutron cross-section, high density material is disposed about the emitter core. This high density material is absorptive of the lower average energy beta radiation emitted by decay of the activation products, but is substantially transmissive to the high average energy prompt electrons emitted by the emitter core. Insulating material encompasses the conductive layer about the emitter core. An outer conducting sheath is provided about the insulating material. An electrical lead-in is connected through the outer sheath and the insulating material to the emitter core material. This electrical lead-in is brought to electron current measuring means along with a lead from the outer conductive sheath, whereby the electron current can be measured.

DESCRIPTION OF THE PREFERRED EMBODIMENT

Figure 1:
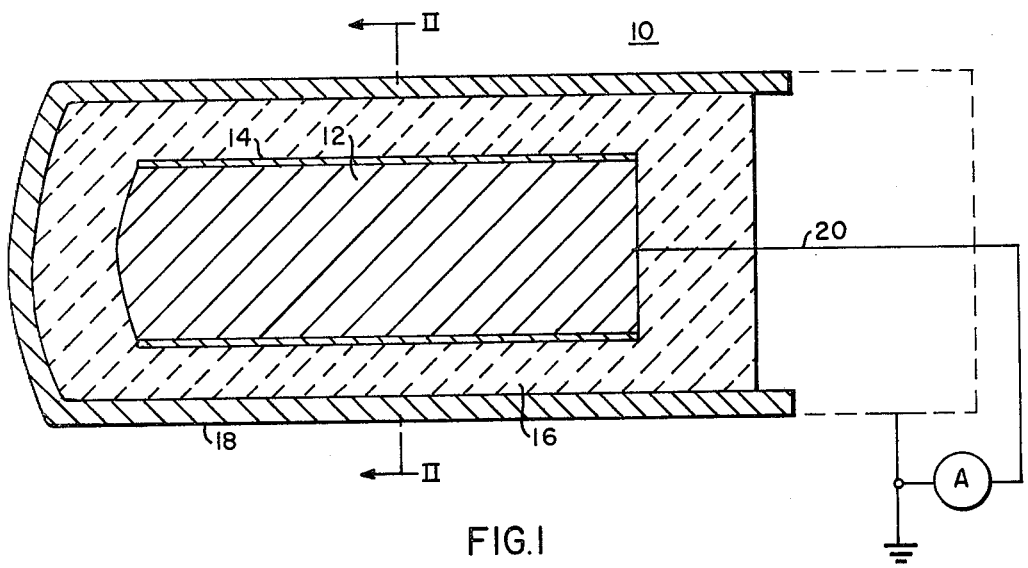
FIG. 1 is a sectional view of an embodiment of the present invention.
Figure 2:
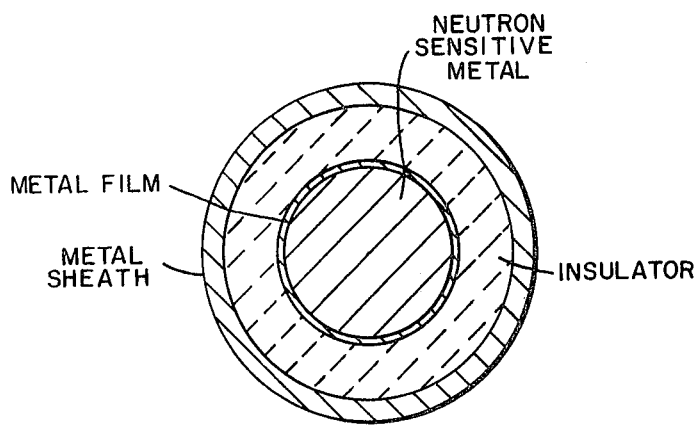
FIG. 2 is a cross sectional view taken along lines II—II of FIG. 1.

The present invention can be best understood by reference to the exemplary embodiment in the drawing wherein in FIG. 1 the neutron detector 10 comprises a centralized emitter core 12 of for example cobalt which is here shown in generally cylindrical configuration, with a diameter ranging typically from 20 to 80 mils. A thin conductive layer 14 of platinum is disposed substantially about the emitter core 12, with the conductive layer 14 typically having a thickness of 3 to 5 mils. The conductive layer 14 need only encompass the lateral area of the emitter core, since this is the direction in which most of the emitted radiation is directed. An insulating densely compacted layer of magnesia or alumina is disposed about the conductive layer 14. The thickness of the insulating layer 16 is typically about 10 to 20 mils. An outer conductive sheath 18 is provided about the insulating material of several mils thickness, and is typically a high nickel and low manganese content steel such as Inconel.

An electrical lead-in 20 is brought from the emitter core 12 out through the insulating layer 16, and is carried as the central conductor of a coaxial cable connected to the outer sheath 18 is generally indicated by the dotted lines. The conductors are connected to low current level ammeter A, one end of which is grounded. The typical current levels being measured are of the order of $10^{-8}$ amperes, and conventional ammeters operable in this range are well known in the art.

The cobalt emitter material upon absorption or neutron capture, produces activation products cobalt-60 and cobalt-61. Both of these activation products decay by beta radiation emission, or what can be termed delayed electron emission of a low average energy level. This low average energy level beta radiation is absorbed by the platinum layer 14. Since the conductive layer 14 is electrically common to the emitter core conductive material this absorption of electronic charge does not appear as part of the output current. The output current is produced as a result of neutron capture by the emitter core material which produces capture gamma radiation which in turn interacts with the detector material to produce prompt electrons of high average energy, which are substantially transmitted through the conductive layer 14 as well as the insulator layer 16, and are collected at the collector electrode 18.

Gold is another effective material which can be used for the emitter core in that it has a high neutron cross section and will spontaneously emit radiation upon capturing neutrons. Gold exhibits an activation product which has a high delayed beta radiation emission current associated therewith, which has contributed to a high background signal for prior art devices which attempt to use gold.

The conductive material for layer 14 can be platinum, lead, or bismuth which are all relatively low neutron cross section materials of high density. The high density of these conductive metals permits use of a thin layer which effectively absorbs the low average energy beta radiation but is substantially transmissive to the higher average energy prompt electrons produced. Such a thin conductive layer 14 permits use of an increased emitter thickness for maximum sensitivity for a given overall device dimension.

The device of the present invention has a practically instantaneous response to change in neutron flux levels. This response makes the device particularly useful for fast response safety monitoring. The fast response is due to the utilization of the neutron capture generated, emitted gamma radiation which in turn interacts with the detector material to produce high average energy prompt electrons which is the measured current.

We claim:

1. In a self-powered neutron detector which comprises a radiation absorptive emitter core comprised of a material of high neutron cross section that spontaneously emits radiation upon capturing neutrons, which emitted radiation includes high average energy prompt electrons produced by emitted gamma ray interactions and delayed beta radiation emitted by decay of the activation product;

an insulating material encompassing the emitter core, and an outer conductive sheath about the insulating material, which outer conductive sheath is of a material which produces little radiation upon exposure to neutrons, an electrical lead-in connected to the emitter core, which lead-in is brought through the insulating material whereby the lead-in and the outer conductive sheath can be electrically connected to electron current measuring means;

the improvement wherein a thin conductive layer of low neutron cross-section and high density material is disposed substantially about the emitter core, which high density material is absorptive of the beta radiation emitted by decay of the emitter core activation product, but is substantially transmissive to the high average energy prompt electrons emitted by the emitter core.

2. The detector set forth in claim 1, wherein the insulator is magnesia or alumina.

3. The detector set forth in claim 1, wherein the conductive layer of high density material is about 3 to 5 mils thick.

4. In a self-powered neutron detector which comprises a radiation absorptive emitter core selected from one of cobalt or gold that spontaneously emits radiation upon capturing neutrons, which emitted radiation includes high average energy prompt electrons produced by emitted gamma ray interactions and delayed beta radiation emitted by decay of the activation product;

an insulating material encompassing the emitter core, and an outer conductive sheath about the insulating material, which outer conductive sheath is of a material which produces little radiation upon exposure to neutrons, an electrical lead-in connected to the emitter core, which lead-in is brought through the insulating material whereby the lead-in and the outer conductive sheath can be electrically connected to electron current measuring means;

the improvement wherein a thin conductive layer of low neutron corss-section and high density material selected from one of platinum, lead, or bismuth and is disposed substantially about the emitter core, which high density material is absorptive of the beta radiation emitted by decay of the emitter core activation product, but is substantially transmissive to the high average energy prompt electrons emitted by the emitter core.

5. A self-powered neutron detector comprising a cobalt emitter core, a thin platinum layer encompassing the emitter core, an insulating layer about the platinum layer, and an outer conductive sheath, with an electrical lead-in brought out from the emitter core and isolated from the outer conductive sheath, whereby the lead-in and the outer conductive sheath can be electrically connected to electron current measuring means.

* * * * *